United States Patent

[11] 3,593,730

| [72] | Inventor | Lawrence R. Burchett<br>Leawood, Kans. |
|---|---|---|
| [21] | Appl. No. | 769,436 |
| [22] | Filed | Oct. 21, 1968 |
| [45] | Patented | July 20, 1971 |
| [73] | Assignee | Kwiki Systems, Inc.<br>Continuation of application Ser. No.<br>531,383, Mar. 3, 1966, now abandoned. |

[54] MECHANIZED CARWASHING APPARATUS
16 Claims, 8 Drawing Figs.

[52] U.S. Cl. .................................................. 134/123,
134/179, 134/180, 134/183, 239/185, 239/251,
239/499
[51] Int. Cl. ....................................................... B60s 3/04
[50] Field of Search ........................................... 134/45,
123, 176, 179, 180, 181, 182, 183; 239/77, 185,
225, 246, 251, 499

[56] References Cited
UNITED STATES PATENTS

| 1,586,997 | 6/1926 | Hull | 239/225 X |
|---|---|---|---|
| 2,660,744 | 12/1953 | Cockrell | 134/123 X |
| 2,750,708 | 6/1956 | Handfield | 239/77 X |
| 2,854,680 | 10/1958 | Wilson | 134/123 X |
| 2,896,857 | 7/1959 | Tompkins | 134/123 X |
| 3,167,797 | 2/1965 | Hergonson | 134/123 X |
| 3,208,088 | 9/1965 | Sulzberger et al. | 134/123 X |
| 3,400,727 | 9/1968 | Daum et al. | 134/123 X |

OTHER REFERENCES
" Kwiki Whirlaway," AUTO LAUNDRY NEWS, Vol. 14, No. 11, p. 38, Nov. 1965 (Copy in Group 367).

*Primary Examiner*—Robert L. Bleutge
*Attorney*—Scofield, Kokjer, Scofield & Lowe

ABSTRACT: A closed loop track is supported above an automobile, the track having mounted thereon a carriage which travels around the track and which carries a spray mechanism for spraying the vehicle during travel of the carriage around the track. The carriage is so mounted that the jet reaction from the spray assists in providing traction. The spray units are rotary jet-powered arms.

PATENTED JUL 20 1971

INVENTOR
Lawrence R. Burchett

BY Scofield, Kokjer, Scofield & Lowe
ATTORNEYS

INVENTOR
Lawrence R. Burchett

BY
ATTORNEYS

MECHANIZED CARWASHING APPARATUS

This application is a continuation of application Ser. No. 531,383, filed Mar. 3, 1966 and which is now abandoned.

One of the main objects of the invention is to provide carwashing apparatus which lends itself particularly well to automated operations, more specially coin-operated carwashing stations, and yet which is extremely simple in construction and reliable in operation. A carwash station constructed in accordance with the invention employs very few parts, yet it is thoroughly effective in cleaning automobiles passed therethrough and is capable of withstanding years of intensive use with little maintenance difficulty.

Another important object of the invention is to provide carwashing equipment of the character described which includes uniquely efficient washing mechanism capable of dislodging the most adherent particles of dirt and other foreign matter from the car. A feature of my invention in this respect resides in the provision of specially constructed spinner washing units which produce special liquid jet patterns reaching substantially all exposed body surfaces of the car in rapidly repeated cycles. The dirt particles are in effect hit from at least two opposite sides by high-pressure jets thus to ensure of their removal.

Still another object of the invention is to provide carwash apparatus of the type employing tractor-supported washing means operable to move on a track around an automobile and in which the arrangement is such that traction between the tractor and track is increased during the washing operation. By having accurately timed travel along the track it is possible to operate the equipment on a more efficient time basis, thus producing higher revenues to the owner and operator of a station equipped therewith.

Another object of the invention is to provide an apparatus of the character described in which washing means is suspended from an overhead track and yet which does not require that the traction means itself bear the weight of the washing apparatus.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views.

Figure 1:
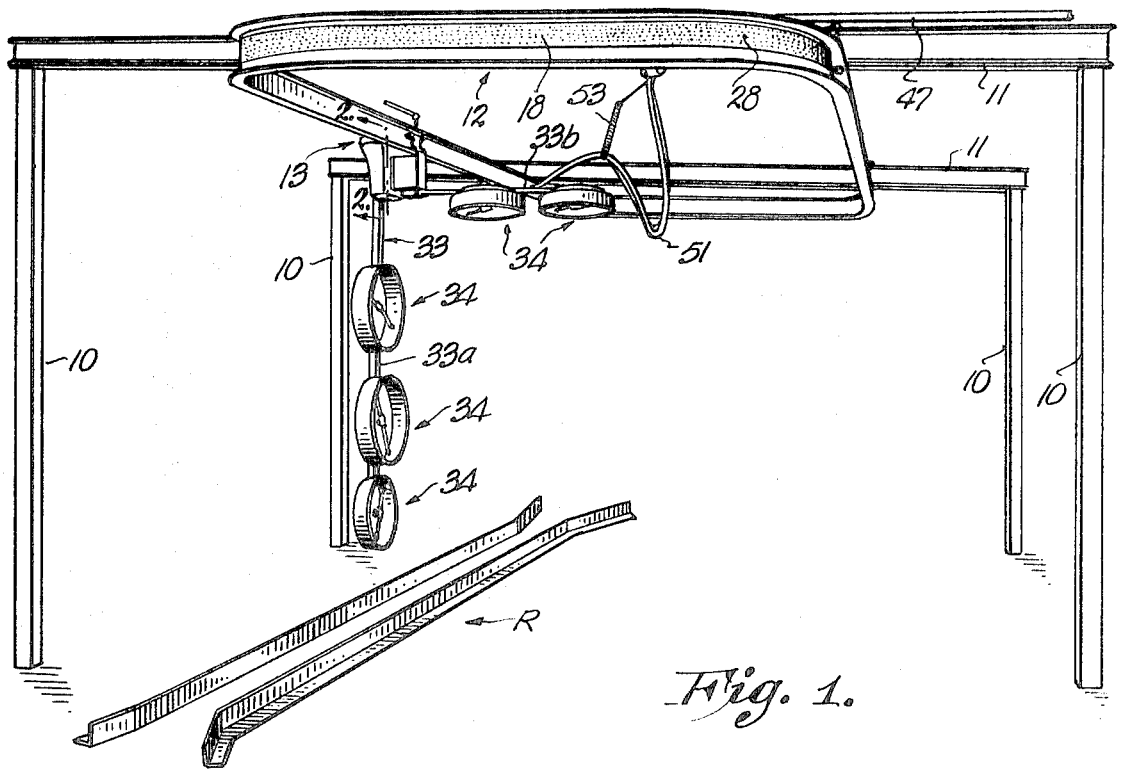
FIG. 1 is a perspective view of a preferred single carwashing apparatus according to the invention, the building or enclosure for the unit not being shown.
Figure 2:
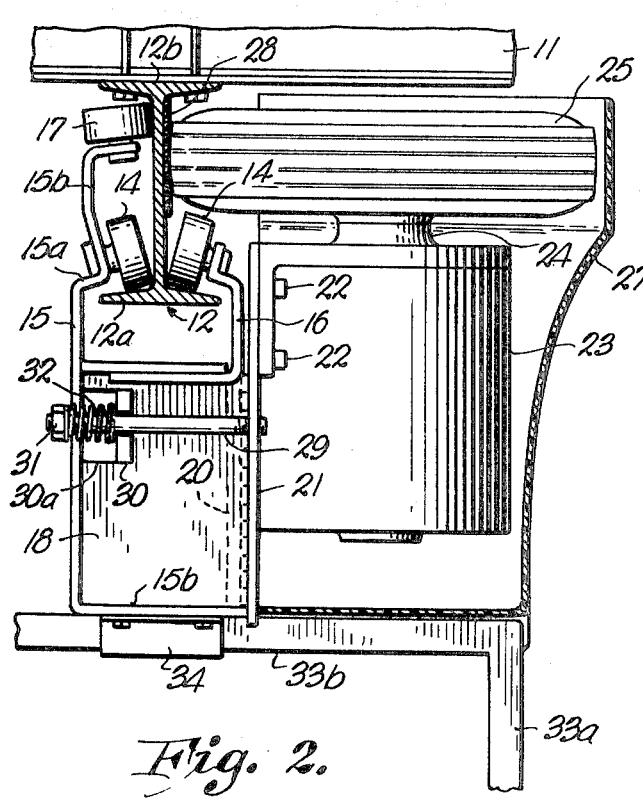
FIG. 2 is an enlarged fragmentary sectional view taken generally along the line 2–2 of FIG. 1 in the direction of the arrows.

Referring now to the drawing and initially to FIG. 1, shown therein are two archlike supporting structures comprising the vertical columns 10 and bridging crossbeams 11 at the upper ends of the column. These columns are normally set in cement or other proper footing. Connected securely to the crossbeams 11 is a closed loop track 12 which in the preferred embodiment of the invention is I-shaped in cross section. Track 12 has the lower flange 12a and upper flange 12b (FIG. 2). The upper flange is bolted to the crossbeams 11 at the points of registry therewith. Other forms of support structure may be used.

The track is supported at a level well above the height of the highest vehicle to be accommodated.

It will be understood that the track 12 will have a length and width somewhat in excess of the maximum length and width of the largest vehicle which the carwash installation is designed to handle. The reason for this will become more apparent as the description proceeds.

Figure 3:
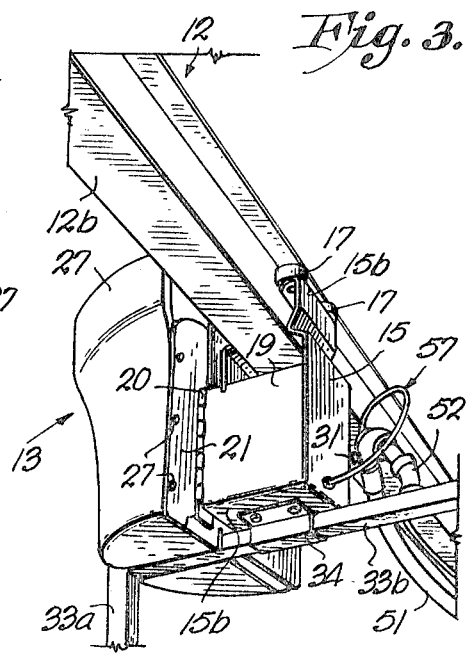
FIG. 3 is a fragmentary perspective view, looking upward of the combined tractor and suspension assembly for the washing means.

Supported on the track is a combined tractor and carrier unit 13, the details which are best seen in FIGS. 2 and 3. The unit 13 is supported from the rail 12 by means of opposed symmetrically arranged rollers 14 which ride upon the upper surface of the lower flange 12a of the track. The rollers 14 are preferably nylon and they are respectively supported in suitable bearings for rotation about slightly inclined axes parallel with the inclination of the adjacent upper surface of the flange on which they ride. The rollers 14 are connected through conventional bearings and mounting means with the main structural elements 15, 16 forming a part of the tractor and carrier unit.

The member 15 comprises mainly a vertical platelike portion having an inwardly jogged section 15a providing the mounting for the outer roller 14. This section continues upwardly with an extension portion 15b which is inturned at its upper end to mount rollers 17 (FIG. 3). The rollers 17 are stabilizing rollers when they are engaged with the inside face of the vertical web of the track 12. The other main structural member 16 is secured to an extension welded or otherwise firmly secured to and projecting from the inside face of plate 15. Each roller 14 is supported from plate 16 in the same manner as the rollers on the plate 15.

It should be noted at this point that while FIG. 2 shows only one roller working on each side of the central web of the track, each of the members 15 and 16 in fact carries two rollers with the rollers spaced along the track from one another. There are also two rollers 17 at the upper end of extension 15b, as can be seen in FIG. 3.

The inside plate 15 is inturned at its lower end to provide the bottom flange 15b. This flange and the major vertical portion of member 15 are welded to spaced end walls 18, 19, respectively, to form a boxlike structure which is open on one side.

Supported on the open side of the boxlike structure for pivotal movement with respect to a vertical hinge axis defined by vertical hinge 20 (FIG. 3) is a motor mounting plate 21. This plate has firmly secured to it, as by bolts 22, the mounting base portion of an electric motor 23. The motor has the output shaft 24 on which is mounted the pneumatic rubber-tired wheel 25. The motor and wheel are covered by the molded shroud or housing 26 which can be screwed or otherwise fastened to the plate 21 as exemplified at 27.

Wheel 25 is the traction drive means for the combined tractor and carrier unit. As can best be seen in FIG. 2 it bears toward the web of the rail or track 12. To provide a roughened surface for the wheel to ride on and thus improve traction, a foraminous strip 28 is adhered to the track in the path of the wheels completely around the track. This strip may be of aluminum or other appropriate metal having perforations therein. Alternatively, it may be of expanded metal.

The motor mounting plate 21 is biased about the axis of hinge 20 toward a position in which it is parallel with the main plate 15 of the unit, the biasing means being shown generally in FIG. 2. This comprises a bolt 29 which is firmly secured to plate 21 and projects therefrom toward the plane of the main portion of member 15. The bolt passes loosely through an aperture formed in a flange 30 located in the path of the bolt and which is secured to the plate 15 as by the extension 30a. A nut 31 is threaded onto the outer end of the bolt 29 and a coil spring 32 is interposed between this nut and the confronting face of the flange 30. The spring obviously acts to draw the motor mounting plate 21 towards the plate 15, thus to firmly engage the traction wheel with the track at all times.

Suspended below the tractor carrier 13 is the washing means for the unit, the main element of which comprises the generally L-shaped pipe 33 having the vertical leg 33a and the horizontal leg 33b. This pipe is preferably of hollow rectangular construction and is capped or closed at its opposite ends. The pipe is supported beneath the tractor carrier by means of a hat-shaped clamp 34 which is bolted to the bottom 15b of the main support structure for the tractor carrier. It will be noted that the molded casing 27 for the motor is recessed along the bottom to receive the underlying portion of the horizontal pipe leg 33b.

Mounted upon the pipe 33 on both the horizontal and vertical legs thereof are the spinner jet units 34, each of which is essentially identical in construction. Since they are substantially identical, a description of only one will be given, it being understood that the same description applies to the others with any exceptions to be later noted.

Each spinner unit comprises a sleeve portion 35 which is sleeved over the pipe leg on which it is mounted. The sleeve has an opening 35a which registers with a corresponding opening 34c formed in the pipe leg. The sleeve is set in place by means of machine bolts 36 which pass through the sleeve and are threaded into appropriately tapped openings in the pipe.

Sleeve 35 is welded to a fitting 36 having a passageway 37 therethrough which makes a 90° turn and connects with the lower end of a stepped counterbore 38 in the fitting. Received in the counterbore 38 is the inwardly projecting stub end of a cylindrical tube 39. Tube 39 has an O-ring 40 registering with the wall of the counterbore 38 and is supported for rotary motion about its own axis by means of a ball bearing assembly 41.

Figure 4:
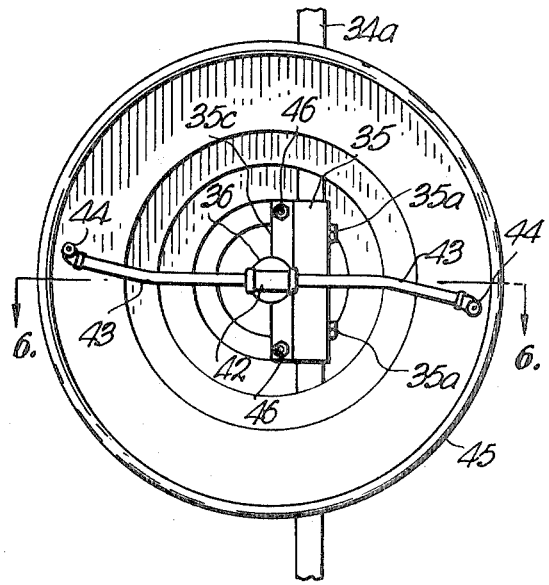
FIG. 4 is an enlarged elevational view of a single rotary spray unit with surrounding hood, the support pipe being shown broken away above and below.
Figure 5:
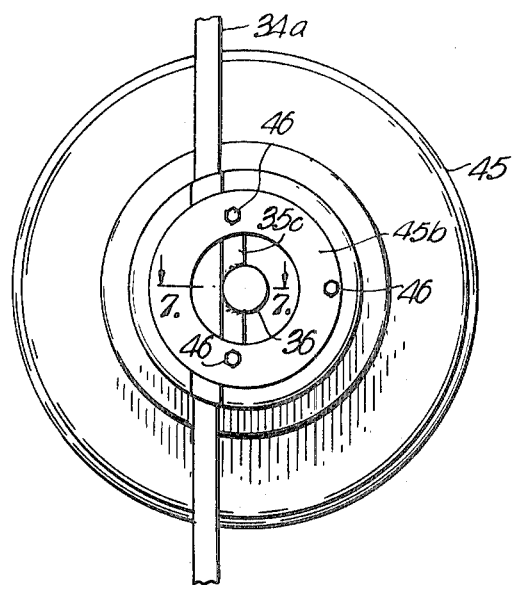
FIG. 5 is a rear elevational view of the structure of FIG. 4.
Figure 6:
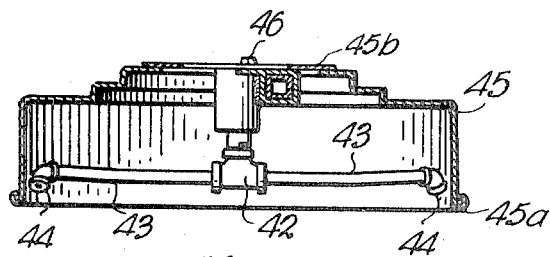
FIG. 6 is a sectional view taken along the lines 6–6 of FIG. 4 in the direction of the arrows.
Figure 7:
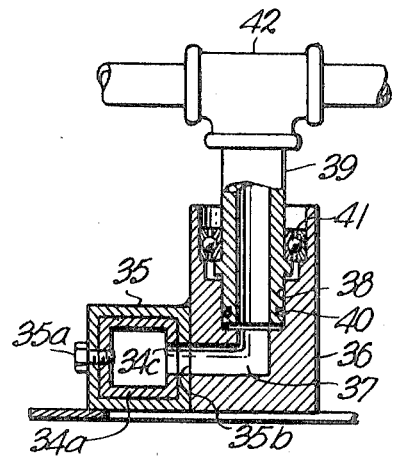
FIG. 7 is an enlarged sectional view taken along the lined 7–7 of FIG. 5 in the direction of the arrows.

The outer end of tube 39 has secured thereto the stem leg of a tee 42. As can best be seen in FIG. 4, oppositely extending tubular arms 43 are threadably coupled with the crosshead of the tee and proceed radially outwardly from the tee for a distance and then are inclined slightly from the radial in opposite directions. At the outer ends the tubular arms 43 have secured thereon elbows terminating in nozzles 44. The nozzles 44 are zero nozzles (cylindrical jet) and are so oriented that they direct small-diameter jets of liquid transversely of the arms and in directions which are oppositely inclined with respect to a radial plane including the axis of the tube 39 and the centerlines of the tubular arms 43 outwardly to the breakpoint in the arms. The jets discharged from nozzles 44 therefore produce reaction forces cooperating to impose a spinning moment on the rotary assembly which includes arms 43, tee 42 and tube 39.

Mounted to and supported from the sleeve 35 of each washing unit is the circular pan-shaped shroud or hood 45 having a circular wall which lies closely adjacent the periphery of the path described by the nozzles 44 during rotation, The rolled-over edge 45a at the open end of the shroud is so positioned as not to interfere with the jets from the nozzles 44. The shroud is mounted to the sleeve 35 by means of a flange 35c on the sleeve, an annular mounting plate 45b secured to the flange, and bolts 46 through the mounting plate, backwall of the shroud and flange 35c.

The units 34 are so spaced relative to one another and the nozzles 44 so angled that the outer periphery of the jet pattern defined on an automobile centered below the track by each spinner unit will link with the pattern of the unit immediately above or below, or in the case of the overhead units, to the side thereof. Thus, the tip units on the vertical leg 33a has a jet pattern which links with that of the middle unit as does that of the middle unit with the jet pattern of the bottom unit. The same can be said of the two units on the upper leg 33b. In this manner it is assured that all parts of the vehicle will be contacted. In this connection, it will be understood that the inclination of the liquid jets from nozzles 44 inwardly or outwardly with respect to the spin axis can be adjusted by twisting the arms 43 one way or the other with respect to the tees.

It will also be noted that the spinner washing units 34 mounted on the vertical leg 33a of the pipe are so supported that the bottom and top units have their central spinner axis on one side of the pipe with the spinner axis of the middle unit on the opposite side. The result of this it to reduce considerably the torque forces acting around the longitudinal axis of the pipe leg 33a. Obviously, when the jets are discharged from the nozzles 44, not only is there a spinning component but also a force component parallel with the axis of spin tending to drive the spinning units toward the pipe leg 33a. By locating the spin axes on alternate sides, the net torque applied to the pipe leg 33a is held to a low value. For the same reasons, the units 34 mounted on the horizontal leg 33b and overlying the vehicles are also set respectively on opposite sides of leg 33b.

Liquid for the spray units 34 is supplied to the pipe 33 by means of a supply pipe 47 which leads from high-pressure pump (not shown). The pipe 47 terminates near the center of track loop 12 in a downwardly turned elbow 48 which connects with a swivel assembly 49 having the output tube 50. This tube is connected with the hose 51 in which leads to a connection 52 with the upper leg 33b of the pipe 33 at a point closely adjacent the tractor. The hose 51 is provided with sufficient length as to permit free movement of the tractor around the track. In order to take up the slack when the tractor is at its position nearest the swivel, the spring 53 is connected at one end with an intermediate portion of the hose. The other end of the spring is supported from the outer end of an arm 54 which extends outwardly from the swivel assembly. It will be understood that any conventional type of swivel assembly may be employed, the object being to provide something which permits rotation of the arm 54 and the hose 51 during travel of the washing assembly around the track.

Figure 8:
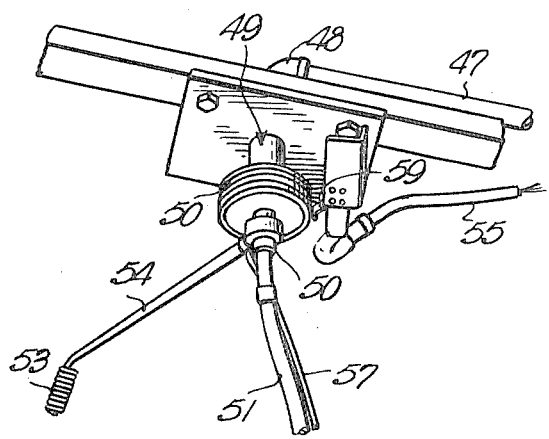
FIG. 8 is an upwardly looking enlarged perspective view of the central water delivery conduit swivel and accompanying electrical swivel and commutator arrangement.

Electricity is supplied to the motor through a somewhat similar arrangement. The electrical power supply line is indicated at 55 (FIG. 8) and this feeds to a stationary brush assembly 59 which rotatably engages the commutator rings on a rotary member 50. These rings are electrically connected with an electric line 57 which leads to the motor. The line 57 is made approximately the same length as the hose 51 and is secured thereto at intervals so that it is supported by the spring 53 in the same manner as is the hose.

A vehicle (not shown) is placed in position for washing by driving it under the track in a substantially centered position, both sidewise and fore and aft, with respect thereto. A guide assembly R can be places on the floor to receive the left front wheel between spaced rails and assist in properly positioning the vehicle as it is driven in. Coin equipment (not shown) can be employed to start and stop the unit, but as the coin equipment plays no part in the invention, details are not given.

In operation, water or liquid detergent is supplied through pipe 47 to the hose 51 and from thence into the pipe 33 and its legs 33a and 33b. This detergent flows into the spinner units in the manner earlier described and the reaction forces resulting from jetting of the liquid from the nozzles 44 creates rapidly rotating action of the arms 43 with a concurrent high-speed jet directed against the surface of the automobile located in position under the track. As earlier noted, the washing units are so set that the side units have overlapping spray patterns as do the upper units so that all surfaces of the vehicle will be reached.

Electric power is supplied to the motor 23 concurrently with the supply of liquid to the washing means. Energization of the motor, of course, results in driving of the wheel 25 and it thus engages tractively with the foraminous plate 26 on the web. The weight of the unit is suspended almost entirely from the rollers 14 while the upper rollers 17 prevent excessive wobble. It is important to note that the reaction forces from the jets 44 in a direction parallel with the axis of spin operate to apply a net moment on the washing pipe 33 tending to pivot the unit about the base of the track 12 and thus press the wheel 25 into tighter engagement with the surface on which it rides, thereby assuring of good traction and of positive displacement along the track. As the tractor carrier moves around the track the automobile or other vehicle is subjected to a continuous and complete washing action from the spinning jets.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a carwashing apparatus, the combination of
a substantially horizontal enclosed loop track structure having a vertical web and a horizontal flange extending inwardly of the loop with a substantial part of the web above the flange,
means connected with and supporting said track at a height to permit a car to be stationed thereunder,
washing means below said track including a vertical member and at least one liquid-jetting washing unit thereon, each said unit including a rotatable spinner rotatable around a generally horizontal axis, said spinner having jet means offset on opposite sides of the said axis and operable to direct liquid jets toward a car located under said track loop,
carriage means supporting said washing means from said track, said carriage means including,
roller means riding on the upper surface of said track flange and on the inside of the web and positioned adjacent the inside of the web.
a motor, and
a traction wheel connected with and driven by said motor and supported for rotation about an upright axis, the rim of said wheel drivingly engaging the side of said web to the outside of the loop.

2. The combination as in claim 1,
a horizontal flange extending away from the web toward the outside of the loop,
said carriage means including another roller riding on the upper surface of the last named flange.

3. The combination as in claim 1,
said carriage means including biasing mechanism yieldably biasing said traction wheel into contact with said web.

4. The combination as in claim 1, including
traction-improving means associated with said side of said track web engaged by said traction wheel.

5. The combination as in claim 1,
each said unit further including a hood partially enclosing said spinner and within which said spinner rotates.

6. In a carwashing apparatus, the combination of
washing means for applying liquid to a car,
power means for moving said washing means around the car,
said washing means including a spinner rotatable around an axis and having nozzles on opposite sides of said axis mounted to discharge jets toward the car,
said washing means further including a hood partially enclosing said spinner and within which said spinner rotates, the open side of said hood being in the direction of discharge of said jets.

7. The combination as in claim 6, including
means mounting said jets so that they produce reaction components which apply a rotary moment on the spinner about said axis.

8. The combination as in claim 6,
said washing means including a plurality of said spinners and hoods with at least one with a substantially vertical spin axis ans to be above the car.

9. A vehicle-washing apparatus including:
an overhead substantially rectangular track means;
a carriage mounted for movement about said track means;
first drive means on said carriage for moving said carriage about said track means when said drive means is energized.
a nozzle assembly mounted on said carriage below said track assembly, said nozzle assembly including a plurality of nozzles rotatable and spaced about a substantially horizontal axis for delivering sprays of liquid at a vehicle positioned below said track means as said carriage moves about said track means;
second drive means for rotating said nozzles; and
means for supplying liquid under pressure to said nozzles.

10. The vehicle-washing apparatus of claim 9, wherein said first drive means includes a motor mounted on said carriage and rotatable means driven by said motor and engageable with said track means.

11. The apparatus of claim 10, wherein said track means includes means providing a vertical tread surface and said drive means includes a rotatable member engageable with said tread surface.

12. The washing apparatus of claim 11 wherein said first drive means includes means biasing said rotatable member toward engagement with said tread surface.

13. The vehicle-washing apparatus of claim 9, wherein said means for supplying liquid to said nozzles includes a first rotary union mounted on said carriage and a second rotary union mounted on said track means each having a stationary member and a rotary member, and conduit means connecting the stationary member of said first rotary union with the rotary member of said second rotary union.

14. A washing apparatus mountable on an overhead substantially rectangular track means, said apparatus including:
a carriage mountable on an overhead track means for movement thereabout;
first drive means on said carriage for moving said carriage about the track means when the drive means in energized;
a nozzle assembly mounted on said carriage, said nozzle assembly including a plurality of nozzles rotatable and spaced about a substantially horizontal axis for delivering sprays of liquid at a vehicle positioned below the track means as the carriage moves about the track means;
second drive means carried by said carriage for rotating said nozzles; and
means for supplying liquid under pressure to said nozzles.

15. The apparatus of claim 14, wherein said first drive means includes a motor mounted on said carriage and rotatable means driven by said motor and engageable with the track means when the carriage is mounted thereon.

16. The vehicle-washing apparatus of claim 14, wherein said means for supplying liquid to said nozzles includes a first rotary union mounted on said carriage and a second rotary union mounted on said track means, each having a stationary member and a rotary member, and conduit means connecting the stationary member of said first rotary union with the rotary member of said second rotary union.